(12) United States Patent
Leighton et al.

(10) Patent No.: US 8,827,368 B2
(45) Date of Patent: Sep. 9, 2014

(54) RECLINER PAWL MEMBER

(75) Inventors: Michael J. Leighton, LaSalle (CA);
Michael Zhang, Plymouth, MI (US);
Tracy A. Schachern, Northville, MI
(US); Douglas M. Coburn, Bloomfield,
MI (US); Kyle M. Doxey, Ann Arbor,
MI (US); Costel Ailenei, Windsor (CA)

(73) Assignee: Johnson Controls Technology Company, Holland, MI (US)

( * ) Notice: Subject to any disclaimer, the term of this patent is extended or adjusted under 35 U.S.C. 154(b) by 516 days.

(21) Appl. No.: 13/124,990

(22) PCT Filed: Oct. 22, 2009

(86) PCT No.: PCT/US2009/061651
§ 371 (c)(1),
(2), (4) Date: Sep. 9, 2011

(87) PCT Pub. No.: WO2010/048383
PCT Pub. Date: Apr. 29, 2010

(65) Prior Publication Data
US 2011/0309665 A1     Dec. 22, 2011

Related U.S. Application Data

(60) Provisional application No. 61/107,460, filed on Oct. 22, 2008.

(51) Int. Cl.
*B60N 2/235*     (2006.01)
(52) U.S. Cl.
USPC ....................................................... 297/367 P
(58) Field of Classification Search
USPC .................... 297/366, 367 R, 367 P
See application file for complete search history.

(56) References Cited

U.S. PATENT DOCUMENTS

| | | | | |
|---|---|---|---|---|
| 5,590,931 A * | 1/1997 | Fourrey et al. | ................ | 297/366 |
| 5,816,656 A | 10/1998 | Hoshihara et al. | | |
| 6,112,370 A * | 9/2000 | Blanchard et al. | ......... | 297/367 R |
| 6,149,235 A * | 11/2000 | Fahim | ......................... | 297/259.2 |
| 6,666,515 B2 * | 12/2003 | Asano et al. | .................. | 297/366 |
| 6,923,504 B1 | 8/2005 | Liu et al. | | |
| 7,150,502 B2 * | 12/2006 | Toba et al. | ................. | 297/367 R |
| 7,578,557 B2 * | 8/2009 | Becker et al. | ............. | 297/367 R |

(Continued)

OTHER PUBLICATIONS

Form PCT/ISA/210 International Search Report, Dated Dec. 14, 2009.

(Continued)

*Primary Examiner* — Peter Brown
(74) *Attorney, Agent, or Firm* — Butzel Long

(57) ABSTRACT

A recliner mechanism comprising a base plate having a plurality of contoured extension members and a central aperture; a pivot member coupled to the central aperture of the base plate; a cam member pivotably coupled to the pivot member; a first and second disc member positioned within the base plate and supported by the contoured extension members; a tooth plate having central aperture for coupling to the pivot member and an annular ring including a plurality of teeth; a first and second pawl member positioned within the base plate and supported by the contoured extension members, the first and second pawl members having a plurality of teeth for engagement with the teeth of the tooth plate and contoured sides for engagement with the base plate, cam member, first and second disc member, and the contoured extension members.

1 Claim, 14 Drawing Sheets

(56) References Cited

U.S. PATENT DOCUMENTS

| | | | |
|---|---|---|---|
| 7,677,666 B2* | 3/2010 | Grable | 297/366 |
| 7,784,872 B2* | 8/2010 | Kienke et al. | 297/367 P |
| 2005/0146187 A1 | 7/2005 | Volker et al. | |
| 2006/0125303 A1 | 6/2006 | Seibold | |
| 2008/0203799 A1* | 8/2008 | Yamada | 297/367 |
| 2011/0181088 A1* | 7/2011 | Zhang et al. | 297/367 P |

OTHER PUBLICATIONS

First Office Action, China, issued Oct. 31, 2012.
English translation of Chinese First Office Action, issued Oct. 31, 2012.

* cited by examiner

Design of Experiment (DOE) Results

RECLINER PAWL MEMBER

CROSS-REFERENCE TO RELATED APPLICATIONS

The present application is a U.S. National Stage filing of International Application No. PCT/US09/61651, filed on Oct. 10, 2009, titled "RECLINER PAWL MEMBER," which claims priority to U.S. Provisional Patent Application No. 61/107,460, filed on Oct. 22, 2008, the entire disclosures of which are incorporated herein by reference.

BACKGROUND

The present disclosure relates generally to the field of vehicle seating. More specifically, this disclosure relates to a recliner mechanism having a recliner pawl member.

It is generally known to provide vehicle seat assemblies having a recliner mechanism so that a vehicle seat occupant may selectively adjust the seat back in various comfort positions as well as to move the seat back to a stow position relative to the seat base. Conventional recliner mechanisms (such as those used in automotive and airline seats) include a pawl member for locking the recliner member in a given position. It is also advantageous to have a pawl member having angled teeth which function to reduce the play (or looseness) in the recliner mechanism. However, angled teeth typically trade off strength due to the angle of the tooth creating a force to back-drive the pawl member out of engagement. The loss of engagement and the subsequent reduction in shear area of the angled tooth causes the pawl to shear below its potential maximum value. Moreover, with conventional, relatively small disc style recliner mechanisms used in vehicle seats, the base plate which the pawl reacts against may deform under high loads. The conventional, relatively small disc style recliner mechanisms have tight tolerance requirements as the material creating the pivot on these recliners typically is very close to the pawl member (or tooth plate or sector) in which the pawl member locks the recliner mechanism. This may reduce the strength of the recliner mechanism and its ability to transfer loads. There remains a significant and continuing need to provide an improved recliner mechanism that can transfer greater loads than existing designs.

SUMMARY

A recliner mechanism for use in a vehicle seat assembly having a seat back and a seat base, the recliner mechanism comprising: a base plate having a plurality of contoured extension members and a central aperture; a pivot member having a pivot axis substantially aligned with the central aperture of the base plate; a cam member coupled to the pivot member; a first and second disc members positioned within the base plate and supported by the contoured extension members; a tooth plate having a central aperture for coupling to the pivot member and an annular ring including a plurality of teeth; a first and second pawl members positioned within the base plate and guided by the contoured extension members, the first and second pawl members having a plurality of teeth for engagement with the teeth of the tooth plate and contoured sides for engagement with the base plate, cam member, first and second disc member, and the contoured extension members; and wherein actuation of the recliner mechanism will rotate the pivot member, such that the cam member moves the first and second pawl members and thereby disengages the teeth of the pawl members from the teeth of the tooth plate thereby releasing the recliner mechanism and thereby enabling the seat back to be pivotably adjusted in the fore and aft directions and wherein at least one contoured extension member has an end portion having a geometry comprising a convex portion for limiting separation between the base plate and the tooth plate when a substantial force is applied to the recliner mechanism.

A seat assembly for use in a vehicle, the seat assembly comprising: a seat back pivotably coupled to a seat base; a recliner mechanism coupled to the seat assembly; a base plate having a plurality of contoured extension members and a central aperture; a pivot member coupled to the central aperture of the base plate; a cam member pivotably coupled to the pivot member; a first and second disc member positioned within the base plate and supported by the contoured extension members; a tooth plate having central aperture for coupling to the pivot member and an annular ring including a plurality of teeth; a first and second pawl member positioned within the base plate and supported by the contoured extension members, the first and second pawl members having a plurality of teeth for engagement with the teeth of the tooth plate and contoured sides for engagement with the base plate, cam member, first and second disc member, and the contoured extension members; wherein actuation of the recliner mechanism will rotate the pivot member, such that the cam member rotates to move the first and second pawl members and thereby disengage the teeth of the pawl members from the teeth of the tooth plate thereby releasing the recliner mechanism and thereby enabling the seat back to be pivotably adjusted in the fore and aft directions and wherein at least one contoured extension member has an end portion having a geometry comprising a convex portion for limiting separation between the base plate and the tooth plate when a substantial force is applied to the recliner mechanism.

DETAILED DESCRIPTION

Figure 1:
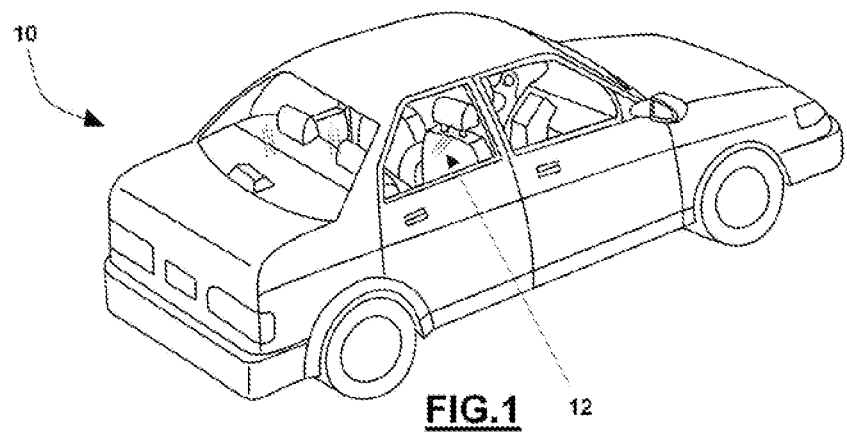
FIG. 1 is a perspective view of a vehicle having a seat assembly according to an exemplary embodiment.
Figure 2:
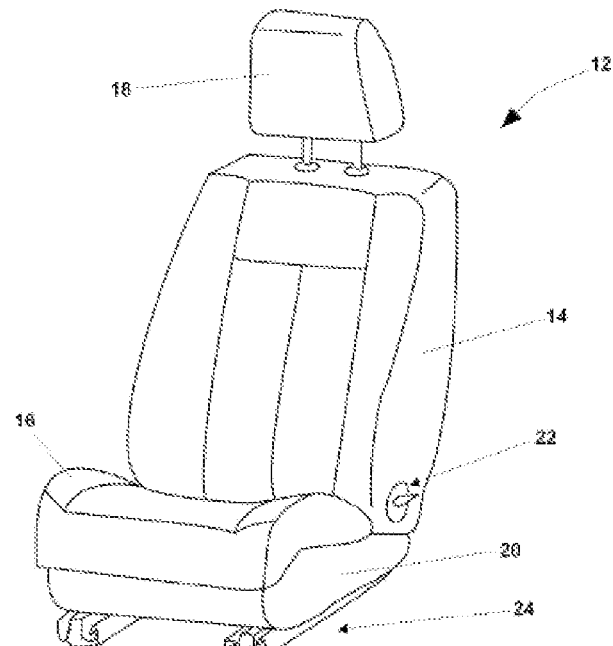
FIG. 2 is a perspective view of a seat assembly according to an exemplary embodiment.

Referring generally to the figures and in particular to FIG. 1, a vehicle 10 is shown according an exemplary embodiment. The vehicle 10 includes one or more vehicle seats 12 for occupants of the vehicle 10. While the vehicle 10 shown is a 4-door sedan, it should be understood that the seat may be used in a mini-van, sport utility vehicle or in any other means in or by which someone travels or something is carried or conveyed or may be used in any market or application including everything from office seating and transportation to planes and space travel in which adjustment of components and effective load transfer is desired. The vehicle seat 12 shown includes a seat back 14 and a seat base 16. One exemplary embodiment of a seat structure 12 is shown in FIG. 2. The seat 12 may include a head restraint 18 and a seat base portion 20. The head restraint 18 extends upward from the seat back 14 and is configured to restrain the head of an occupant. The seat base portion 20 may be configured to allow the seat 12 to be selectively positioned (manually or motor driven) relative to the vehicle 10 interior. The seat 12 may also include a recliner mechanism 22 for adjusting the seat back 14 relative to the seat base 16 and a vehicle track assembly 24 for selectively moving the seat 12 in the fore and aft directions relative to the vehicle 10 floor.

Figure 3:
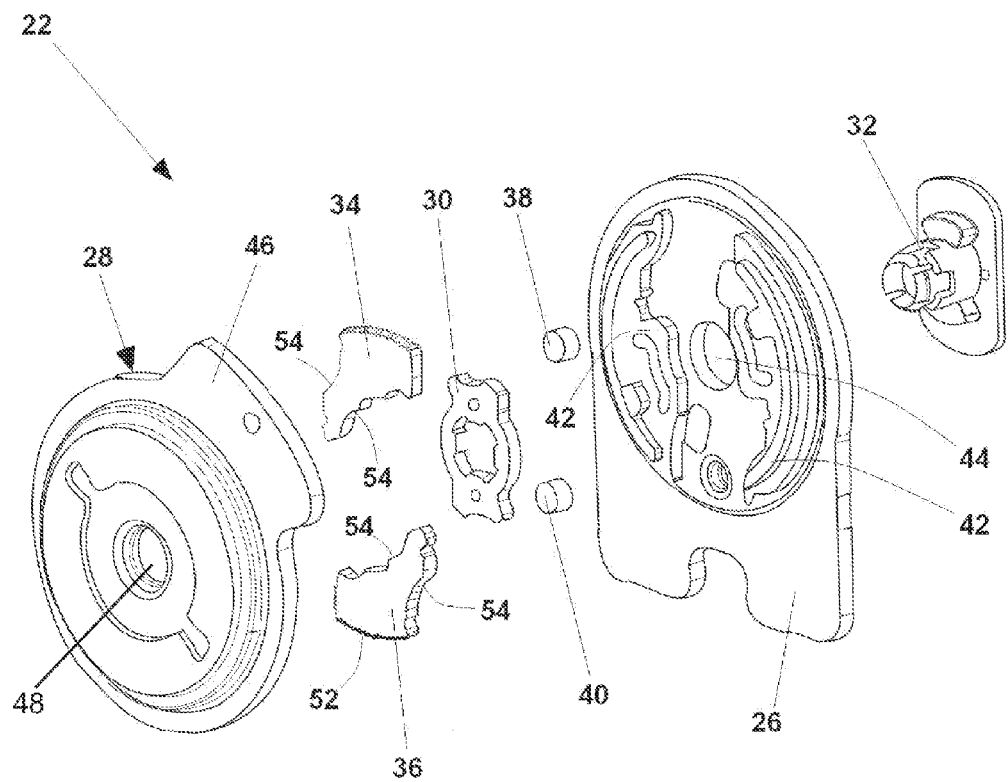
FIG. 3 is an exploded perspective view of a recliner mechanism according to an exemplary embodiment.
Figure 4:
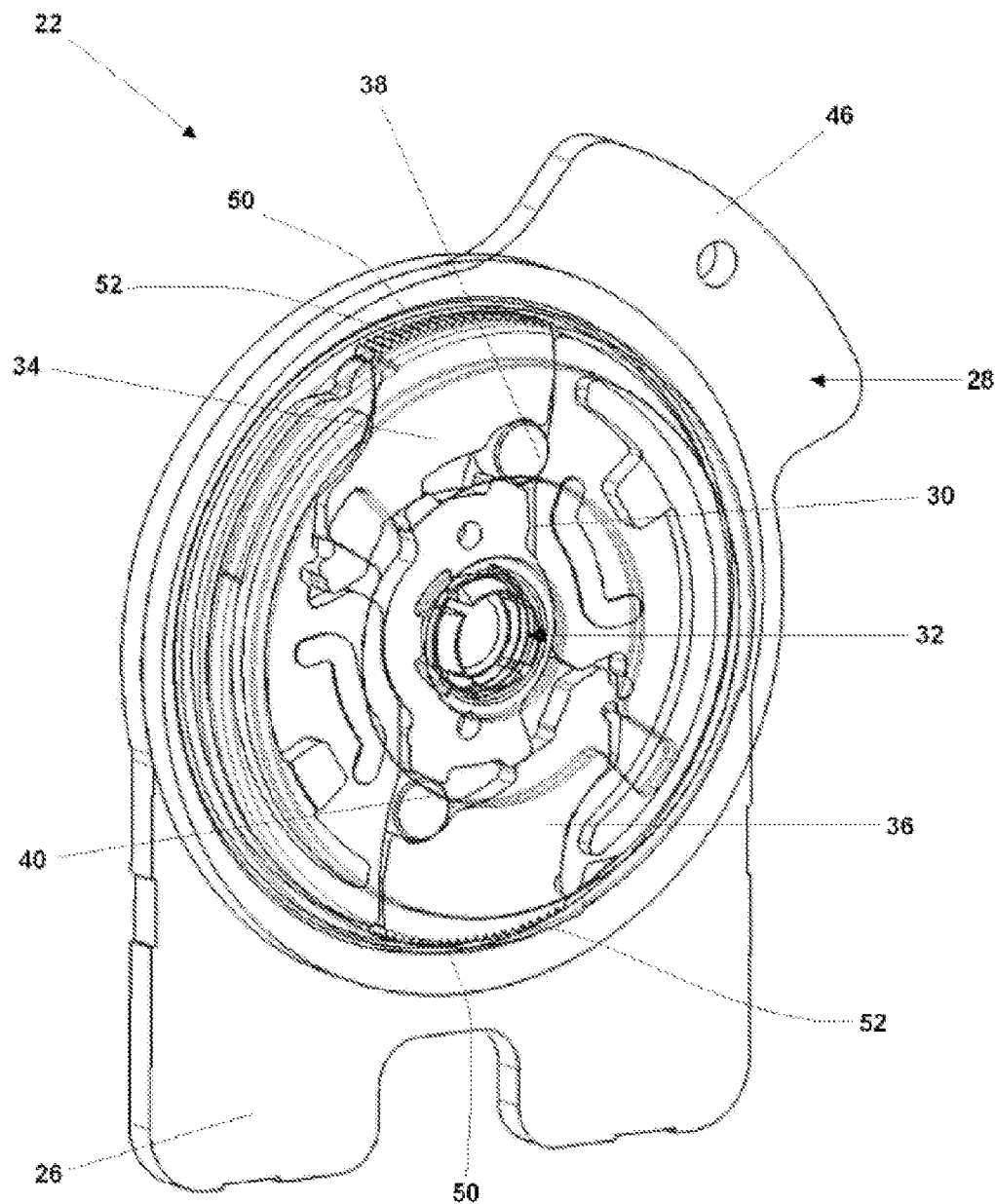
FIG. 4 is a perspective view of a recliner mechanism according to an exemplary embodiment

Referring in particular now to FIGS. 3 and 4, a recliner mechanism 22 for use as an adjuster in a vehicle seat 12 is shown. The recliner mechanism 22 includes a base plate 26, a tooth (or sector) plate 28, a cam member 30, a pivot member 32, a first or upper pawl member 34, a second or lower pawl member 36, a first or upper disc member 38, and a second or lower disc member 40 such as that disclosed in PCT Patent Application Publication No. 2008/046001 A1, published Apr. 17, 2008 the disclosure of which is incorporated herein by reference. The base plate 26 includes contoured bosses or extension members 42 which support and guide the first (or upper) and the second (or lower) pawl members 34, 36 in position. The base plate 26 also includes an aperture 44 at its center through which the pivot member 32 extends. The cam member 30 is carried by the pivot member 32 such that the cam member 30 engages the first and second pawl members 34, 36 and the first and second disc members 38, 40. The tooth plate 28 includes an attachment member 46 for coupling to a vehicle seat 12 component (e.g., seat back 14, etc.). The tooth plate 28 also includes an aperture 48 at its center thr coupling the tooth plate 26 to the pivot member 32 and, along with the base plate 26) thereby enclosing the internal components of the recliner mechanism 22 (i.e., first and second pawl members 34, 36, cam member 30, first and second disc members 38, 40, etc.). The tooth plate 28 also includes a plurality of teeth 50 for engaging the first and second pawl members 34, 36. The first and second pawl members 34, 36 also each include a plurality of teeth 52 to engage the respective teeth 50 in the tooth plate 28 and also include contoured sides 54 that interact with the base plate 26, the cam member 30, and the first and second discs 38, 40 for operating the recliner mechanism 22. When the recliner mechanism 22 is actuated, such as by the pivot member 32 being rotated, the earn member 30 rotates to move the first and second pawl members 34, 36 and thereby remove (disengage) the teeth of the pawl members 52 from the teeth of the tooth plate 50 thereby unlocking (or unlatching or releasing) the recliner mechanism 22 and the seat back 14 may be selectively pivoted in the fore or aft direction and thereby adjusting the vehicle seat 12 according to the needs and/or desires of the occupant. The first and second pawl members 34, 36 and the cam member 30 include a plurality of surfaces (edges or sides) which may have a variety of geometries (e.g., contoured to correspond to an opposing surface of another component, etc.) for interacting with each other and the first and second disc members 38, 40, and the contoured extension members 42. The pivot member 32 also comprises an extension member having a plurality of flexible flanges or tab members. The extension member is designed to be inserted into the central apertures of the base plate 26, the cam member 30, and the tooth plate 46 such that the tab members secure the components to the pivot member 32.

Figure 5:
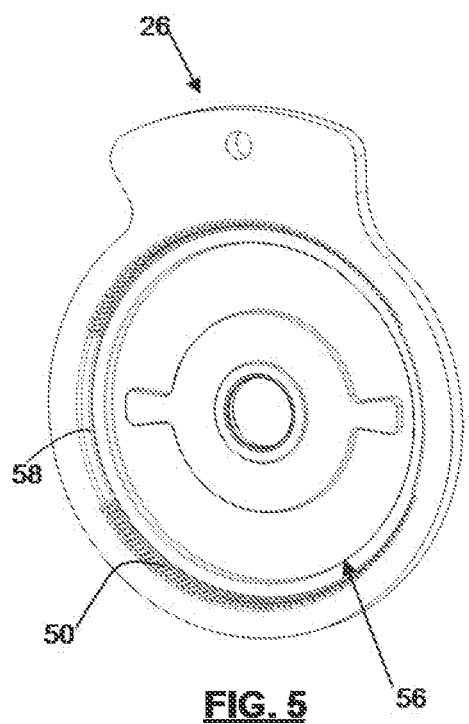
FIG. 5 is a perspective view of the tooth plate of FIG. 3 according to an exemplary embodiment.
Figure 6:
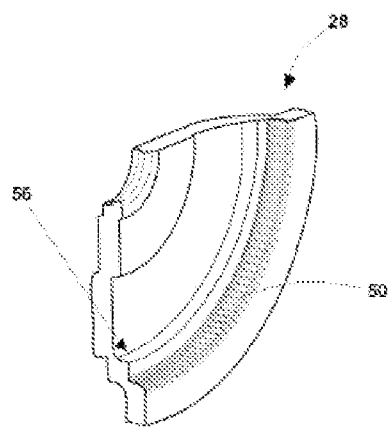
FIG. 6 is a partial perspective view of the tooth plate web ring of FIG. 3 according to an exemplary embodiment.

Referring in particular now to FIGS. 5 through 6, the tooth plate 28 is shown in greater detail. The tooth plate 28 includes an annular ring 56 having a plurality of teeth 50 lining the inner surface circumference of the ring web 58, as best shown in FIG. 6. As noted above, it is the teeth of the web ring 50 of the tooth plate 28 that engage the teeth of the pawl members 52 to lock the recliner mechanism 22.

Figure 7:
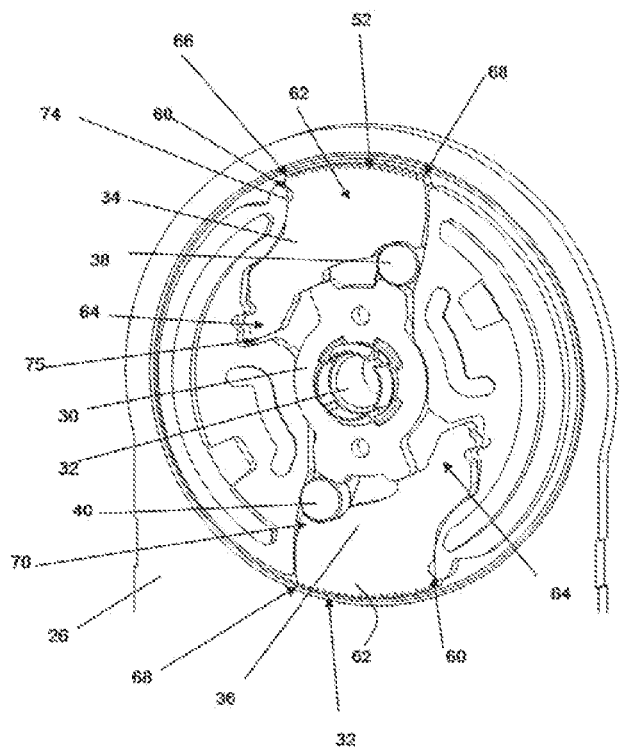
FIG. 7 is a side view of the recliner mechanism of FIG. 3 with the tooth plate removed according to an exemplary embodiment.

Referring in particular now to FIG. 7, the recliner mechanism 22 with the tooth plate 28 removed is shown. The first pawl member 34 and the second pawl member 36 each include an undercut portion 60, a pawl throat portion 62, a tail portion (member) 64, a heel portion (member) 66, a toe portion (member) 68, and a nose portion (member) 70. As best shown in FIG. 7, the first and second pawl members 34, 36 are designed to have a toleranced fit within the contoured passages of the base plate 42 such that the pawl members 34, 36 is movable and operable within the passage of the base plate 72 while the pawl heel 66 and pawl nose 70 fit into the base plate corner/pawl engagement area 74 and the base plate/pawl tail gap 76, respectively.

Figure 8:
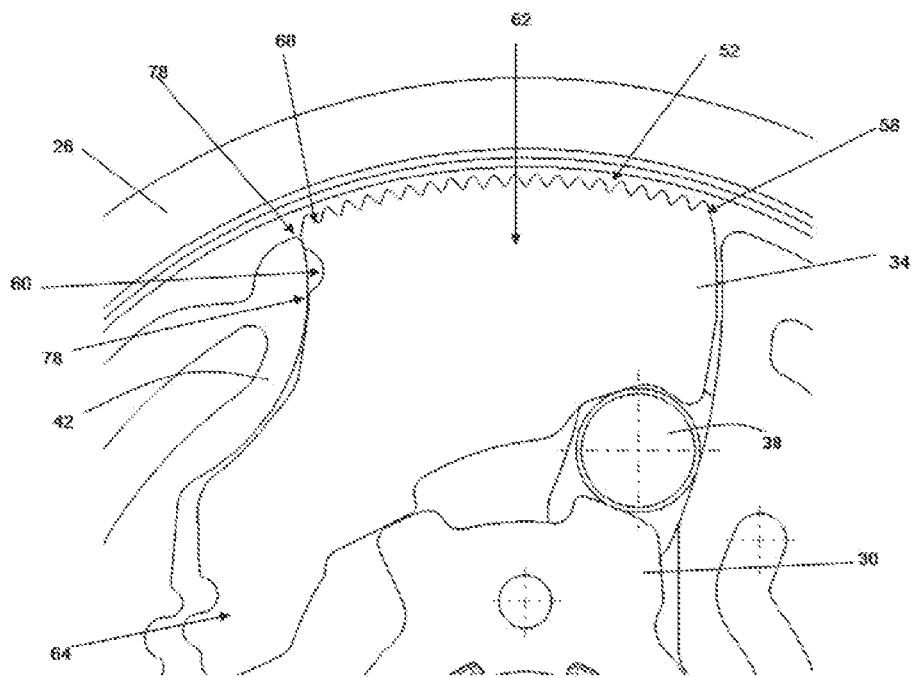
FIG. 8 is an enlarged partial side view of the recliner mechanism of FIG. 7 according to an exemplary embodiment.

Referring now to FIG. 8, an enlarged partial view of the recliner mechanism 22 and base plate 26 (i.e., taken from the tooth plate side) is shown. The modified corner geometry of the pawl member 78 limits the pawl members' 34, 36 ability, under rearward load, to rotate and limit or stop functioning (i.e., hang up, become jammed, become wedged, etc.) on the base plate member 26 since the surface area of contact between the pawl members 34, 36 and the base plate 26 is reduced by the modified corner geometry 78. The limitation on pawl 34, 36 rotation will reduce disengagement of the teeth of the pawl members 52 from the tooth plate 28. Thereby, the rearward strength of the recliner mechanism 22 is improved and is therefore more robust.

Figure 9A:
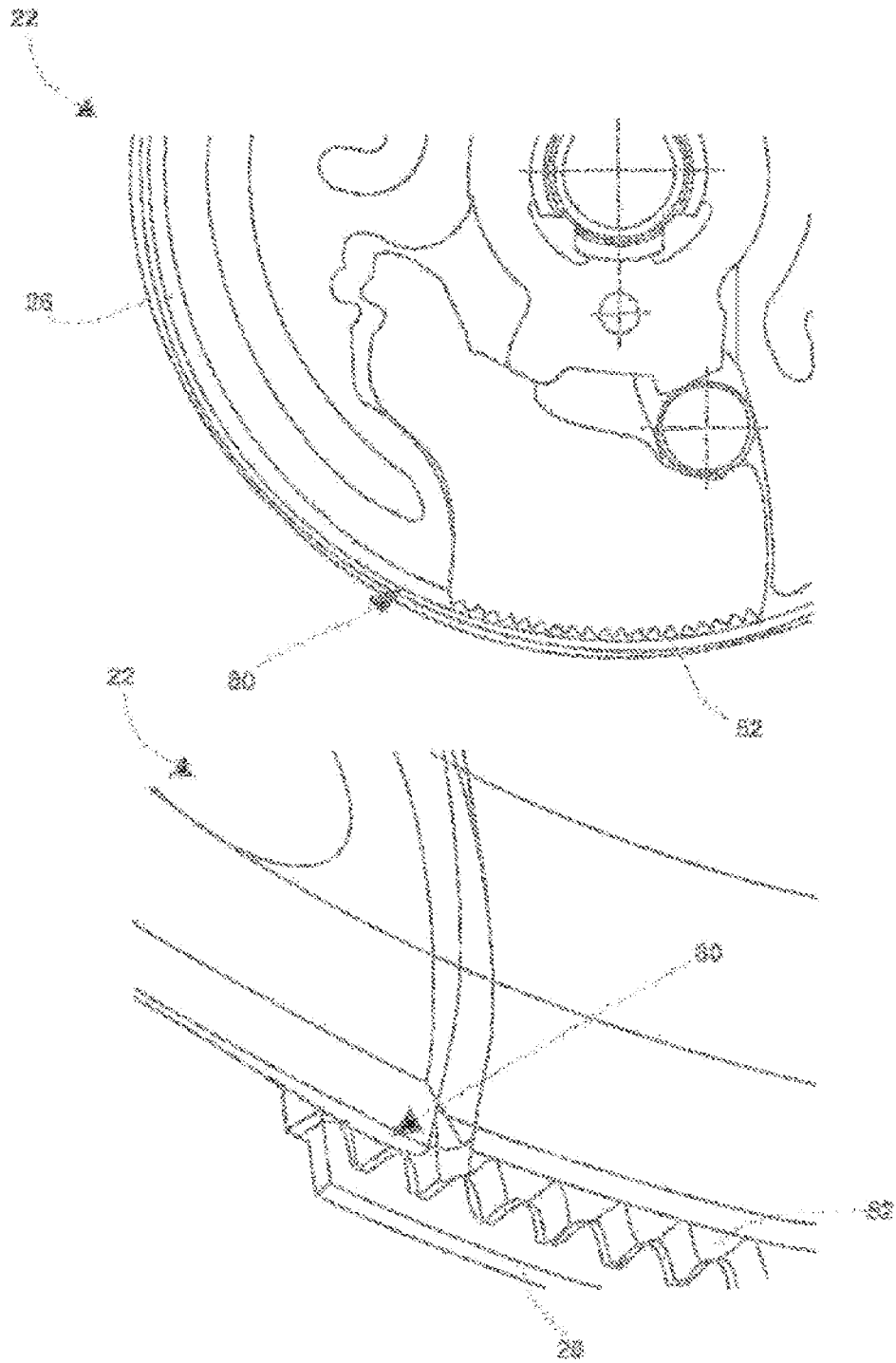
FIGS. 9A and 9B are partial side view comparisons of two recliner mechanisms having alternate base plate/pawl engagement area geometries according to an exemplary embodiment.
Figure 9B:
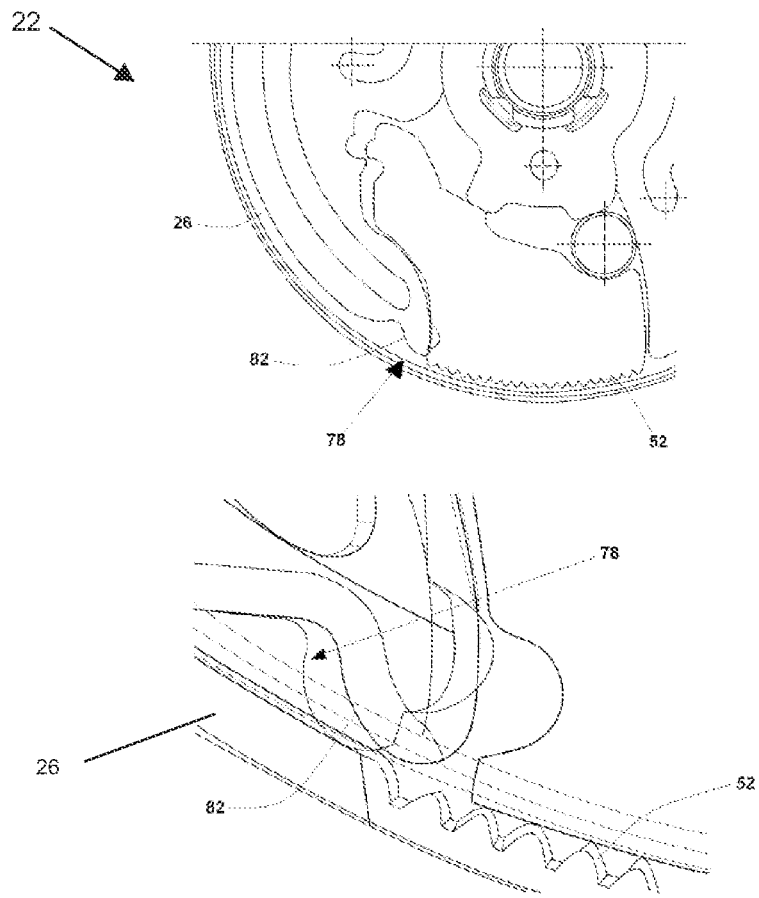

Referring further to FIGS. 9A and 9B, side views of traditional (FIG. 9A) and improved (FIG. 9B) recliner mechanisms 22 having different base plate pawl member engagement area geometries are shown. As shown in FIG. 9A, the corner geometry 80 creates a force at the pawl teeth 52 which may drive the pawl member 34, 36 out of engagement. FIG. 9A generally shows the deformation issue between the base plate 26 and the tooth plate 28 of the original known design of the recliner mechanism 22. The base plate 26 deformation contacted the tooth plate 28 causing separation forces between the two parts which pulled the pawl 34, 36 out of the tooth plate teeth 50 and thereby reducing the strength of the recliner mechanism 22. Separation of the pawl teeth 52 from the tooth plate 28 may drive a wedge of base plate 26 material between the pawl 34, 36 and the tooth plate 28 which may further weaken the recliner mechanism 22 due to pawl 34, 36 and tooth plate 28 separation.

According to one exemplary embodiment as shown in FIG. 9B, the corner of the base plate 26 is modified to limit the material located toward the corner and to thereby limit the material available to possibly be pushed between the base plate 26 and the pawl 34, 36, as well as the base plate 26 and the tooth plate 28. This created a functional issue when releasing the pawl 34, 36 under seat back 14 load. According to another exemplary embodiment to address this issue, the base plate 26 is modified at a point proximal the corner geometry 78 to include a convex surface or undercut feature 82 such that the convex surface of the base plate 82 redirects the deforming base plate 26 material away from the pawl member 34, 36 and its location with respect to the tooth plate 28 such that the modified corner geometry 78, which improves recliner mechanisms 22 release functional efforts, is maintained, as best shown in FIG. 9B and FIG. 10.

Figure 10:
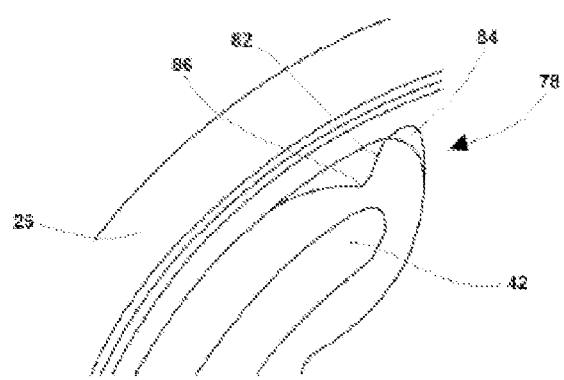
FIG. 10 is a partial side view of the base plate of one disclosed exemplary embodiment.

Referring further to FIG. 10, the modified corner 78 shown further improves recliner 22 strength and robustness by including an end portion 84 that may be formed or alternatively may be machined or cut. The modified corner 78 has a generally concave portion 86 wherein the curved portion faces outward from the annular surface of the extension member of the base plate 42. The base plate 26 also has a convex portion or undercut 82 that is positioned a distance distal from the terminal end of the corner 84 so that forces applied, by the pawl members 34, 36 to the extension member of the base plate 42 cause the corner 78 to deform at the convex portion 82 a distance away from the tooth plate 28 in a manner to limit/prevent "prying" forces (separation forces between the base plate 26 and the tooth plate 28 that occur without the scallop 82). This allows deformation of the extension member of the base plate 42 under relatively high loads but not under fatigue loads experienced during normal operating conditions. The scallop/convex portion 82 of the annular surface of the modified corner of FIG. 9B redirects deformation away from the tooth plate 28 into the undercut 82.

Under rearward load, the tooth plate 28 transfers the load to the pawl member 34, 36 through the engaged teeth 50, 52. The loaded pawl member 34, 36 has a tendency to rotate away from the tooth plate 28 (teeth separation) about the actual pawl rotation center because of the tooth angle. The actual pawl point of rotation is at the corner of the pawl heel 66 (i.e., the contact point of the pawl member 34, 36 with the base plate 26). About this rotation center, the pawl member 34, 36 has a relative larger separation force under load to help the recliner 22 release more smoothly in normal operation. The actual pawl 34, 36 rotation center shifts away from the corner 78 when the base plate 26 deforms, such as under a sufficiently larger rearward load. The load path changes while the pawl 34, 36 rotation center shifts and separation forces gradually reduce and finally, at a given limit point, the teeth 50, 52 stop separating and the pawl 34, 36 is in a self-locked condition. The quicker the pawl 34, 36 rotation center shifts, the less tooth 50, 52 separation there will be and the more robust the recliner mechanism 22. The undercut of the pawl member 82 will make the pawl member 34, 36 rotation center shift more quickly than the pawl member 34, 36 without the undercut 82.

Figures 11A, 11B:
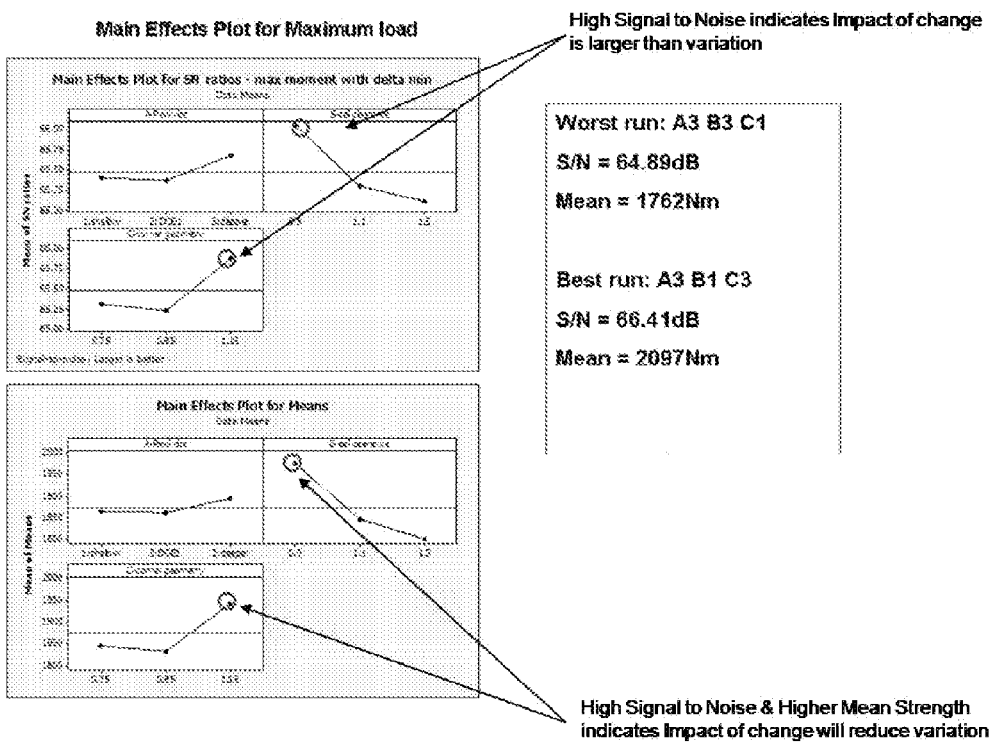
FIG. 11A is a design of experiment (DOE) results chart correlating recliner performance to design modifications to varying tail to base plate clearance geometries and varying corner geometries for the pawl member.
FIG. 11B are design of experiment (DOE) result plots correlating signal-to-noise ratios with the varying geometries of the tail to base plate clearance and corner geometry.
Figure 11C:
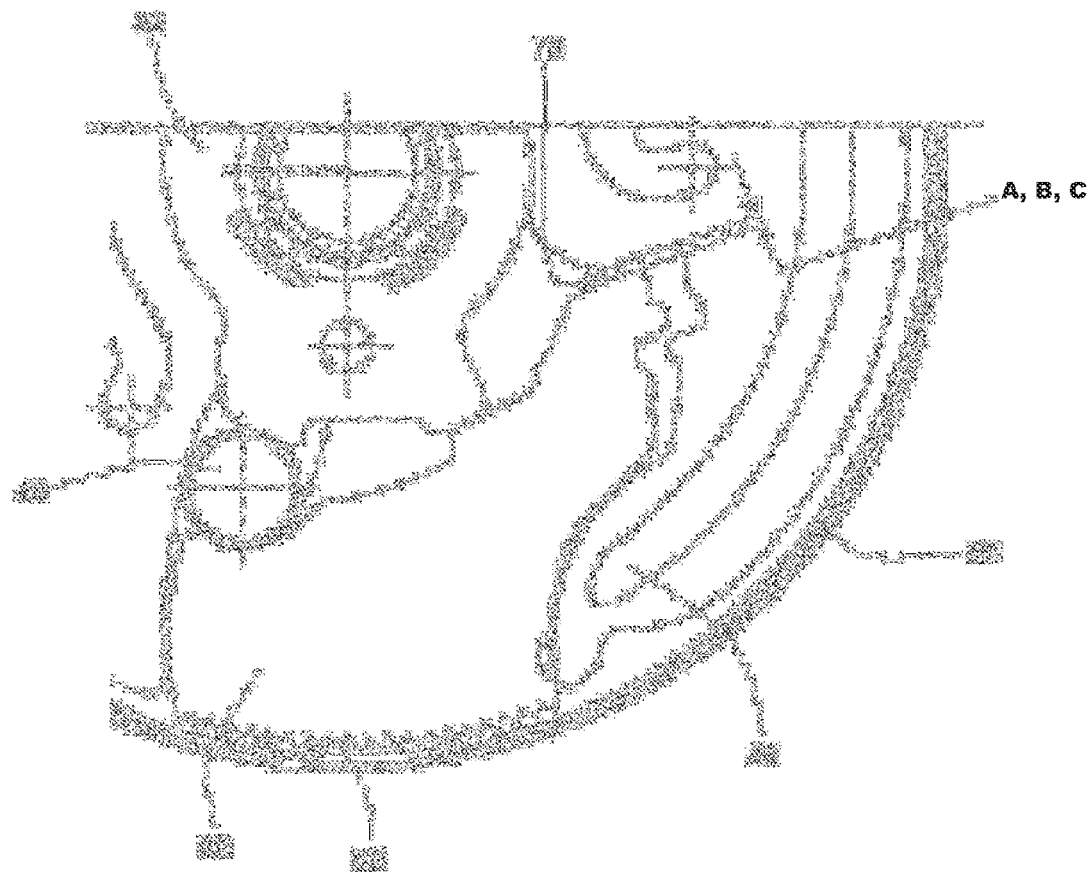
FIGS. 11C through 11E are side views of the pawl member, tail to base plate clearance, and corner geometry having three different designs (A, B, C) according to the exemplary embodiments.
Figure 11D:
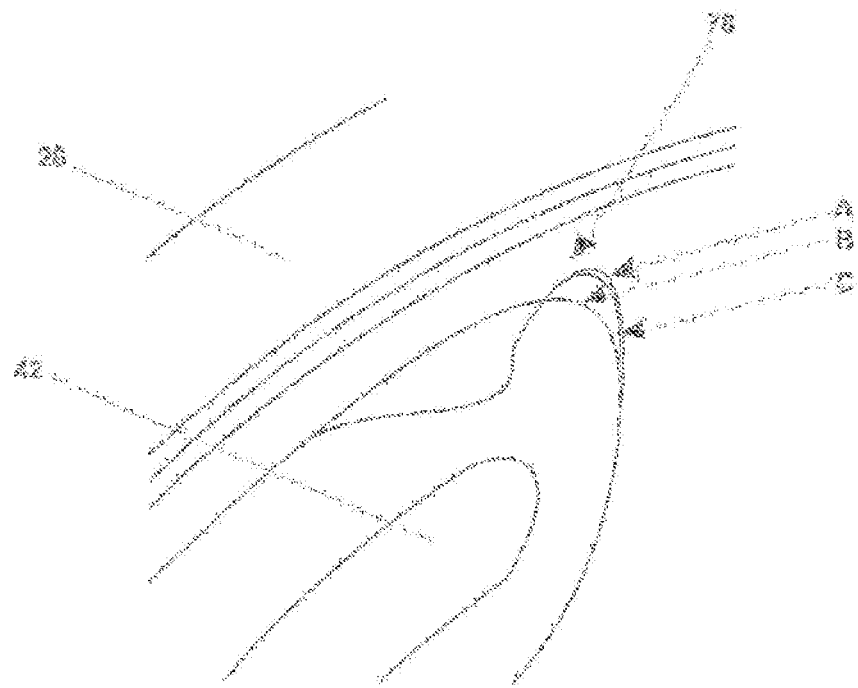
Figure 11E:
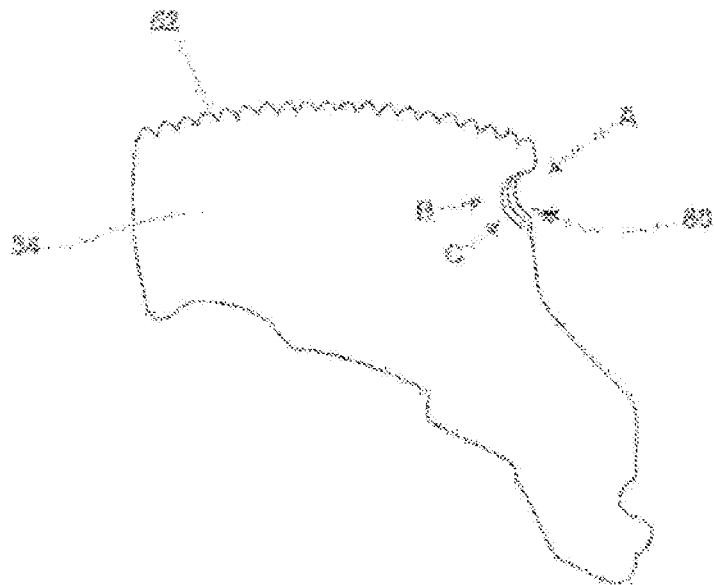

Referring in particular now to FIG. 11A, a chart depicting design modifications for three factors contributing to recliner 22 robustness is shown. The three control factors include the geometry of the pawl member 34, 36 cut out 60 (i.e., scallop or concave portion), the pawl tail to base plate clearance 76, and the base plate corner geometry 78. Each control factor may be designed according to particular optimization levels (e.g., A, B, and C), as shown in FIGS. 11A through 11D. The best test runs may be used as the optimal designs, as shown in FIG. 11B. For example, the pawl tail to base plate clearance may be 0.9 mm (A), 1.1 mm (B), 1.6 mm (C), or the like, as shown in FIG. 11C.

Figure 12C:
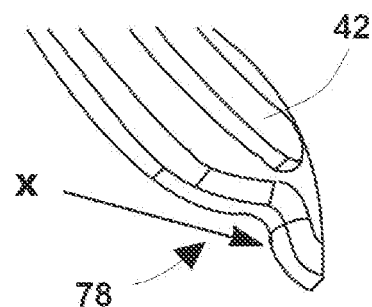
FIGS. 12C through 12E are alternate views of the base plate corner geometries according to the exemplary embodiments.
Figure 12A:
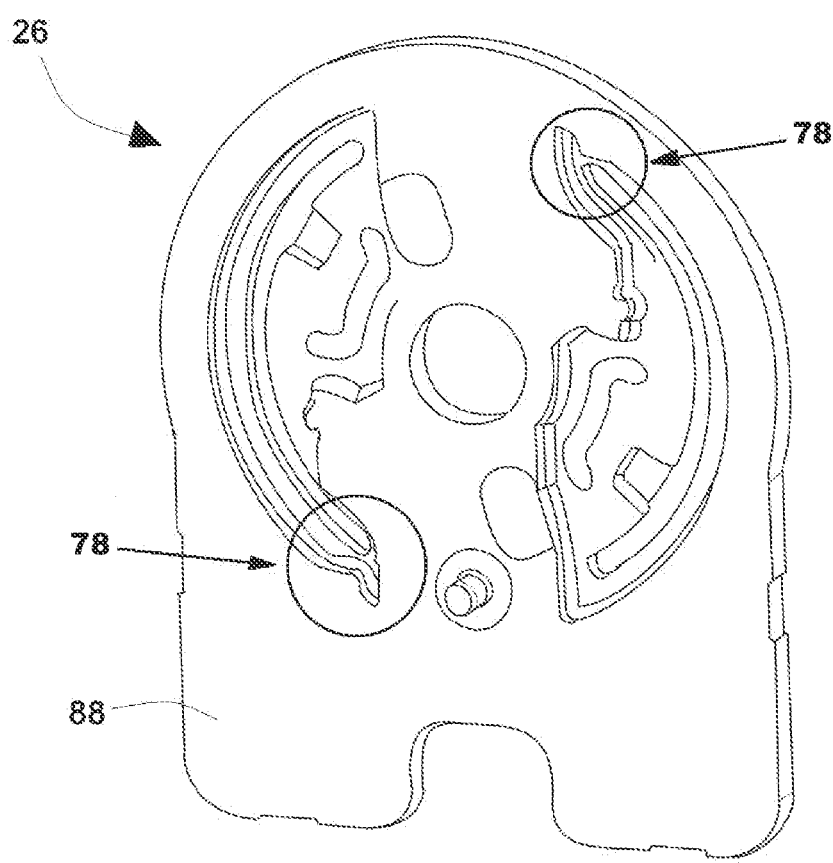
FIGS. 12A and 12B are front and rear perspective views of the base plate according to an exemplary embodiment.
Figure 12D:
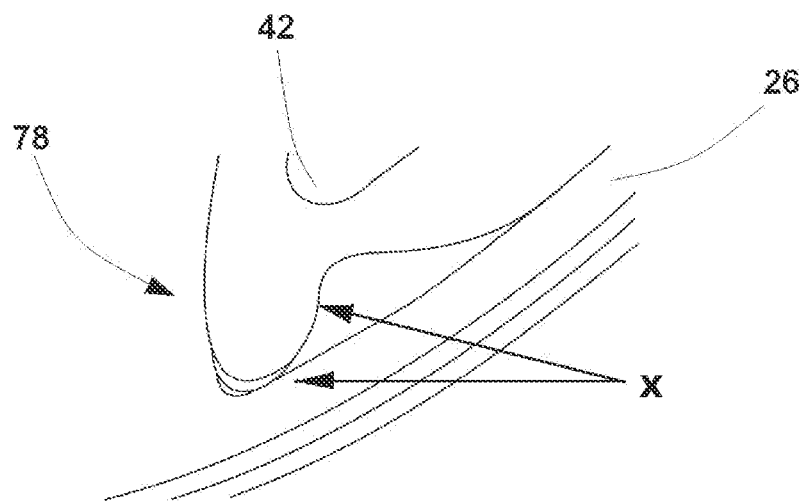
Figure 12B:
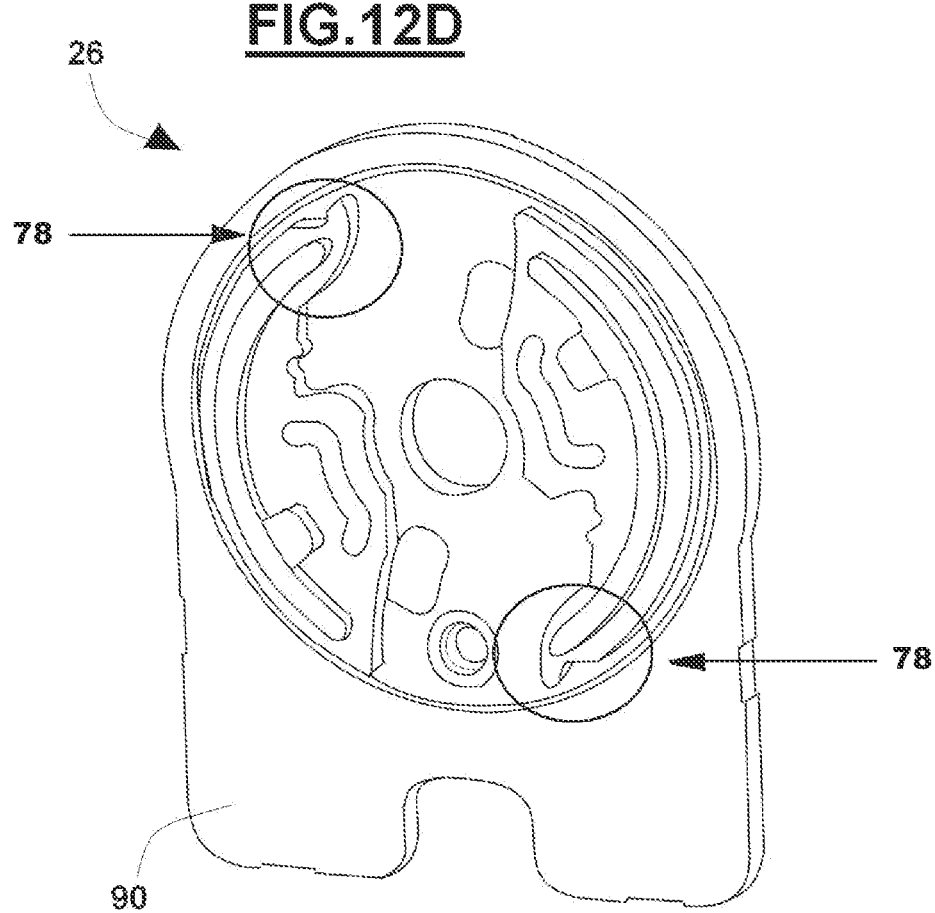
Figure 12E:
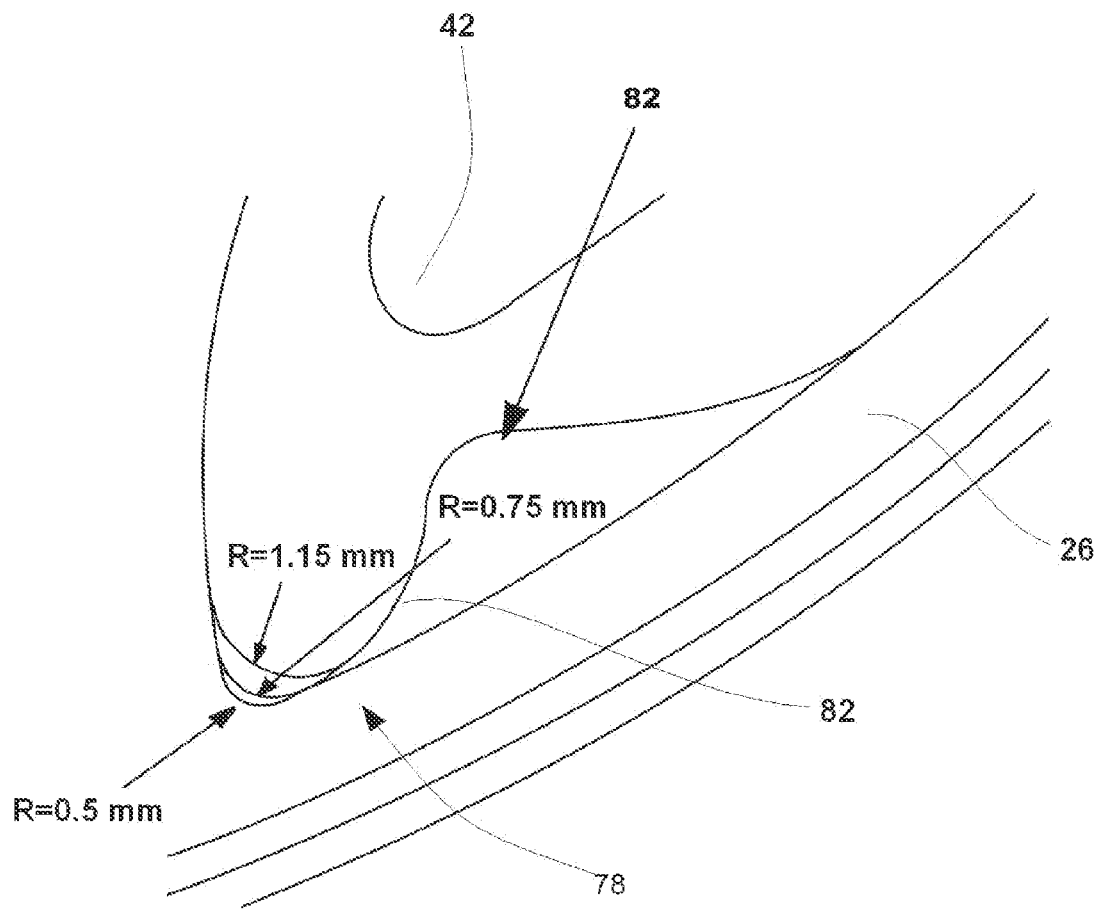

FIGS. 12A and 12B show the front side 88 and rear side 90 of a base plate 26 including the modified corner geometry 78 in the extension members 42 (as shown in FIGS. 12C through 12E). According to an exemplary embodiment, the base plate extension member corner geometry 78 also includes an undercut 82 located at a defined distance from the corner of the extension member 42 of the base plate 26 and having a defined curvature. The modified corner geometry includes an area (X) to be filled in with weld and machined to CAD data. The modified corner geometry may have a different radius for each design, such as 0.5 mm, 0.75 mm, 1.15 mm, or the like, as shown in FIG. 12E.

Figure 13A:
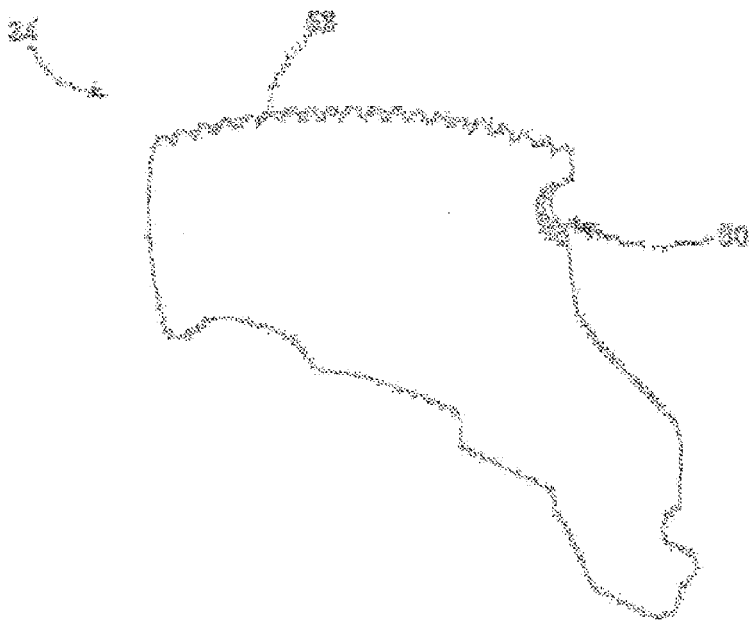
FIGS. 13A through 13C are side and partial perspective views of the pawl member having alternate geometry undercuts according to exemplary embodiments.
Figure 13B:
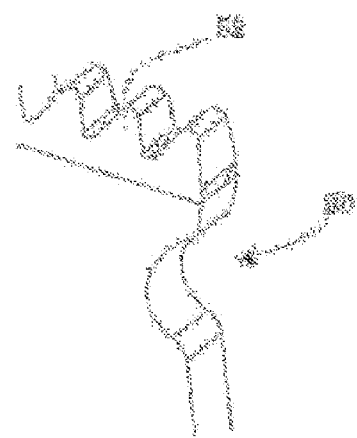
Figure 13C:
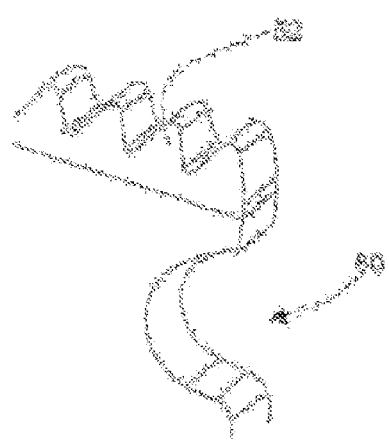

FIGS. 13A through 13C show a pawl member 34, 36 having varying scallop 60 geometries, particularly, the scallops 60 have different sizes. According to an exemplary embodiment, the size of the scallop geometry (or undercut/rib/concave) portion 60 of the pawl member 34, 36 may have different sizes depending upon the particular application.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A recliner mechanism for use in a vehicle seat assembly having a seat back and a seat base, the recliner mechanism comprising:
- a base plate having a central aperture and a plurality of contoured bosses defining abutment surfaces;
- a pivot member rotatably disposed within the central aperture and having a pivot axis substantially aligned with the central aperture of the base plate;
- a cam member coupled to the pivot member for rotation with the pivot member;
- a first and a second pawl member, each pawl member positioned within the base plate and guided by the abutment surfaces of a respective one of the contoured bosses;
- a first and a second disc member positioned within the base plate, each disc member having surfaces engageable with the abutment surfaces of a respective one of the contoured bosses, the cam member, and a respective one of the first and second pawl members;
- a tooth plate having a central aperture for coupling to the pivot member and an annular ring including a plurality of teeth, the base plate and tooth plate together enclosing the cam members, the pawl members, and the disc members;
- the first and second pawl members having a plurality of teeth for engagement with the teeth of the tooth plate, and contoured sides configured for engagement with the base plate, cam member, first and second disc member, and the contoured bosses, such that actuation of the recliner mechanism rotates the pivot member, and the cam member moves the first and second pawl members and disc members and thereby disengages the teeth of the pawl members from the teeth of the tooth plate thereby releasing the recliner mechanism and enabling the seat back to be pivotably adjusted in the fore and aft directions, and at least one of the contoured bosses has an end portion that is convex and includes a concave portion adjacent the convex end portion and facing toward the annular ring of the tooth plate to limit separation forces between the base plate and the tooth plate when a force is applied to the recliner mechanism.

* * * * *